(12) United States Patent
Shimamura et al.

(10) Patent No.: US 10,432,820 B2
(45) Date of Patent: Oct. 1, 2019

(54) IMAGE PROCESSING APPARATUS, IMAGE PROCESSING SYSTEM, CONTROL METHOD FOR IMAGE PROCESSING APPARATUS, AND NON-TRANSITORY COMPUTER READABLE MEDIUM

(71) Applicant: CANON KABUSHIKI KAISHA, Tokyo (JP)

(72) Inventors: Koya Shimamura, Tokyo (JP); Naoki Ito, Kashiwa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/787,370

(22) Filed: Oct. 18, 2017

(65) Prior Publication Data

US 2018/0115680 A1  Apr. 26, 2018

(30) Foreign Application Priority Data

Oct. 24, 2016 (JP) .................................. 2016-207431

(51) Int. Cl.
| | |
|---|---|
| H04N 1/387 | (2006.01) |
| H04N 1/32 | (2006.01) |
| H04N 1/00 | (2006.01) |
| H04N 1/21 | (2006.01) |

(52) U.S. Cl.
CPC ....... *H04N 1/3873* (2013.01); *H04N 1/00453* (2013.01); *H04N 1/2195* (2013.01); *H04N 1/32464* (2013.01); *H04N 2201/0094* (2013.01); *H04N 2201/3254* (2013.01)

(58) Field of Classification Search
CPC ............. H04N 1/00453; H04N 1/2195; H04N 1/32464; H04N 1/3873; H04N 2201/0094;
(Continued)

(56) References Cited

U.S. PATENT DOCUMENTS 5,271,066 A * 12/1993 Leonard ............... G03B 21/115
                                                                353/27 R
6,154,286 A * 11/2000 Konno ................. G03G 15/221
                                                                358/1.13
(Continued)

FOREIGN PATENT DOCUMENTS

| CN | 1933539 A | 3/2007 |
|---|---|---|
| CN | 102568019 A | 7/2012 |

(Continued)

*Primary Examiner* — Negussie Worku
(74) *Attorney, Agent, or Firm* — Canon U.S.A., Inc. I.P. Division

(57) ABSTRACT

One or more image processing apparatuses, image processing systems, control methods and storage mediums for use with same are provided herein. At least one embodiment of an image processing apparatus includes: a scanning unit that scans multiple original documents placed on a platen glass and generates image data; an acquisition unit that acquires pieces of image data of the respective original documents from the image data generated by the scanning unit; a decision unit that decides on a page order based on pieces of geometric information of the pieces of image data acquired by the acquisition unit; and a file creation unit that converts the pieces of image data of the respective original documents into one file in the page order decided by the decision unit and stores the one file.

6 Claims, 14 Drawing Sheets

(58) Field of Classification Search
CPC ....... H04N 2201/3254; H04N 1/00612; H04N 1/32363; H04N 2201/0039; H04N 2201/3288; H04N 1/32128; H04N 2201/3232; H04N 1/00204; H04N 1/00278; H04N 1/00578; H04N 1/0058; G06F 3/1204; G06F 3/1256; G06F 3/1208; G06F 3/121; G06F 3/1244; G06F 3/125; G06K 9/00483; G06K 9/6203; G06K 15/129; G06K 15/14; G06K 15/1868; G06K 15/1872; G06T 11/60; B41J 2/15; B41J 2/2114; G03G 15/50; G03G 15/602; G03G 2215/00177
USPC ........................................ 358/474, 1.15, 442
See application file for complete search history.

(56) References Cited

U.S. PATENT DOCUMENTS

| | | | | |
|---|---|---|---|---|
| 6,594,033 B1 * | 7/2003 | Kujirai | ................. | G06F 3/1208 358/1.18 |
| 6,950,202 B1 * | 9/2005 | Kikugawa | ............... | G06F 21/31 358/1.13 |
| 7,900,146 B2 * | 3/2011 | Kozuka | .............. | G03G 15/5016 358/1.13 |
| 2002/0196979 A1 * | 12/2002 | Yen | ........................... | G06K 7/14 382/190 |
| 2004/0062443 A1 * | 4/2004 | Yen | ........................... | G06K 7/14 382/209 |
| 2004/0151371 A1 * | 8/2004 | Chen | .................. | G06K 9/00234 382/165 |
| 2016/0054954 A1 * | 2/2016 | Iizuka | ................... | G06F 3/1204 358/1.15 |
| 2016/0364619 A1 * | 12/2016 | Ogata | ................ | G06K 9/00362 |
| 2019/0058805 A1 * | 2/2019 | Ito | ...................... | H04N 1/00816 |

FOREIGN PATENT DOCUMENTS

| | | |
|---|---|---|
| JP | 2003338920 A | 11/2003 |
| JP | 2008065670 A | 3/2008 |
| JP | 2009-239594 A | 10/2009 |
| JP | 2009-272678 A | 11/2009 |
| JP | 2012104986 A | 5/2012 |

* cited by examiner

FIG. 4

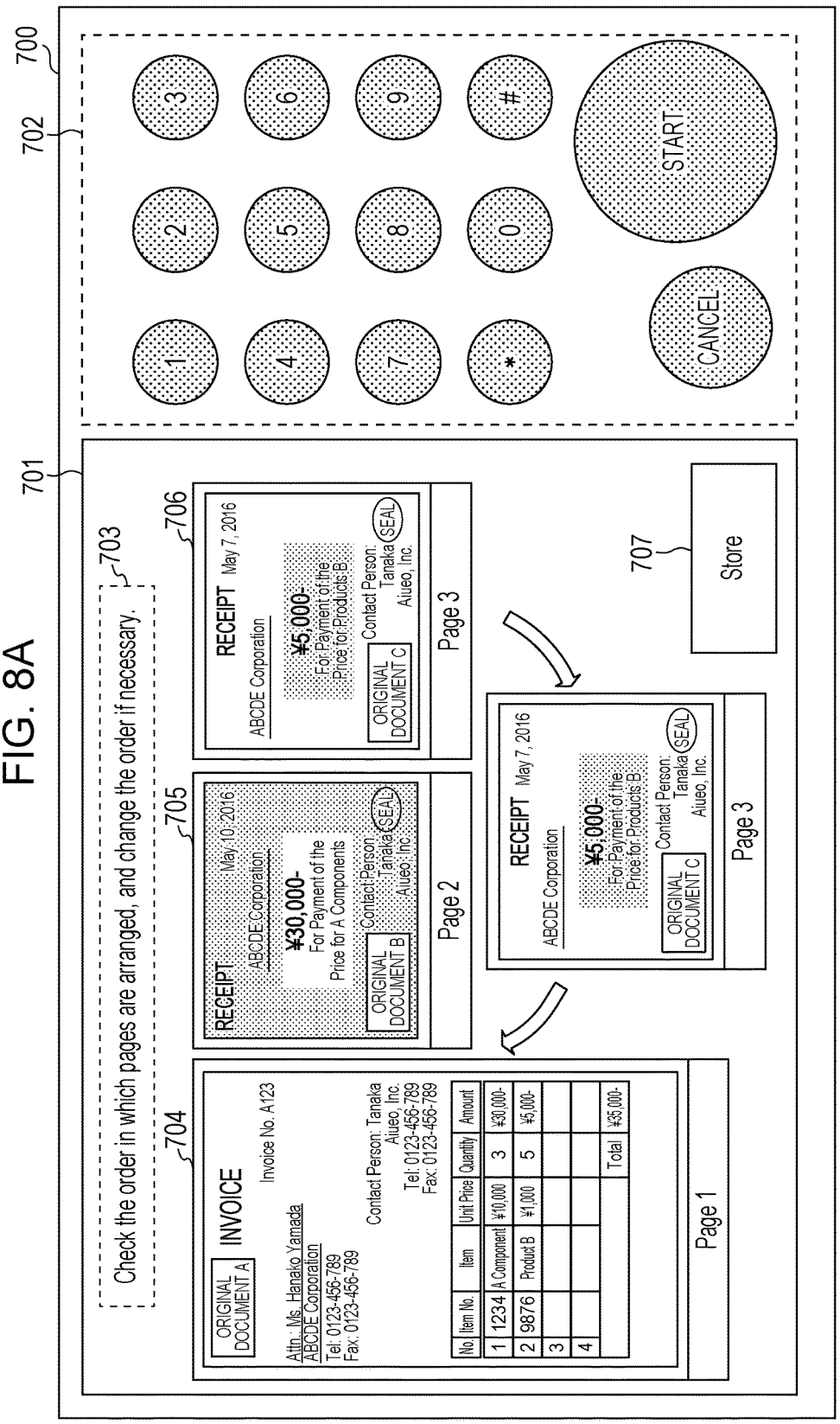

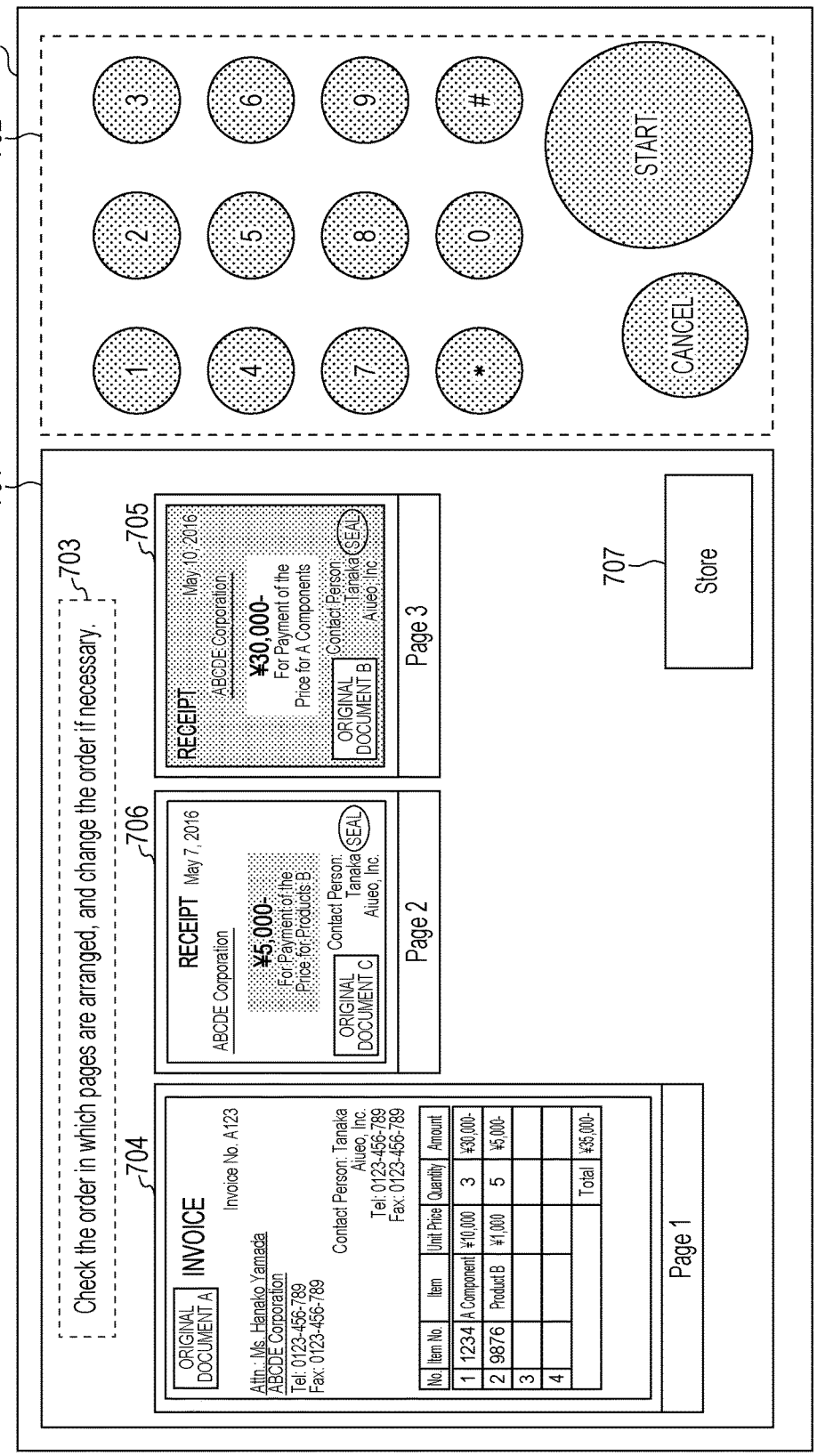

FIG. 9

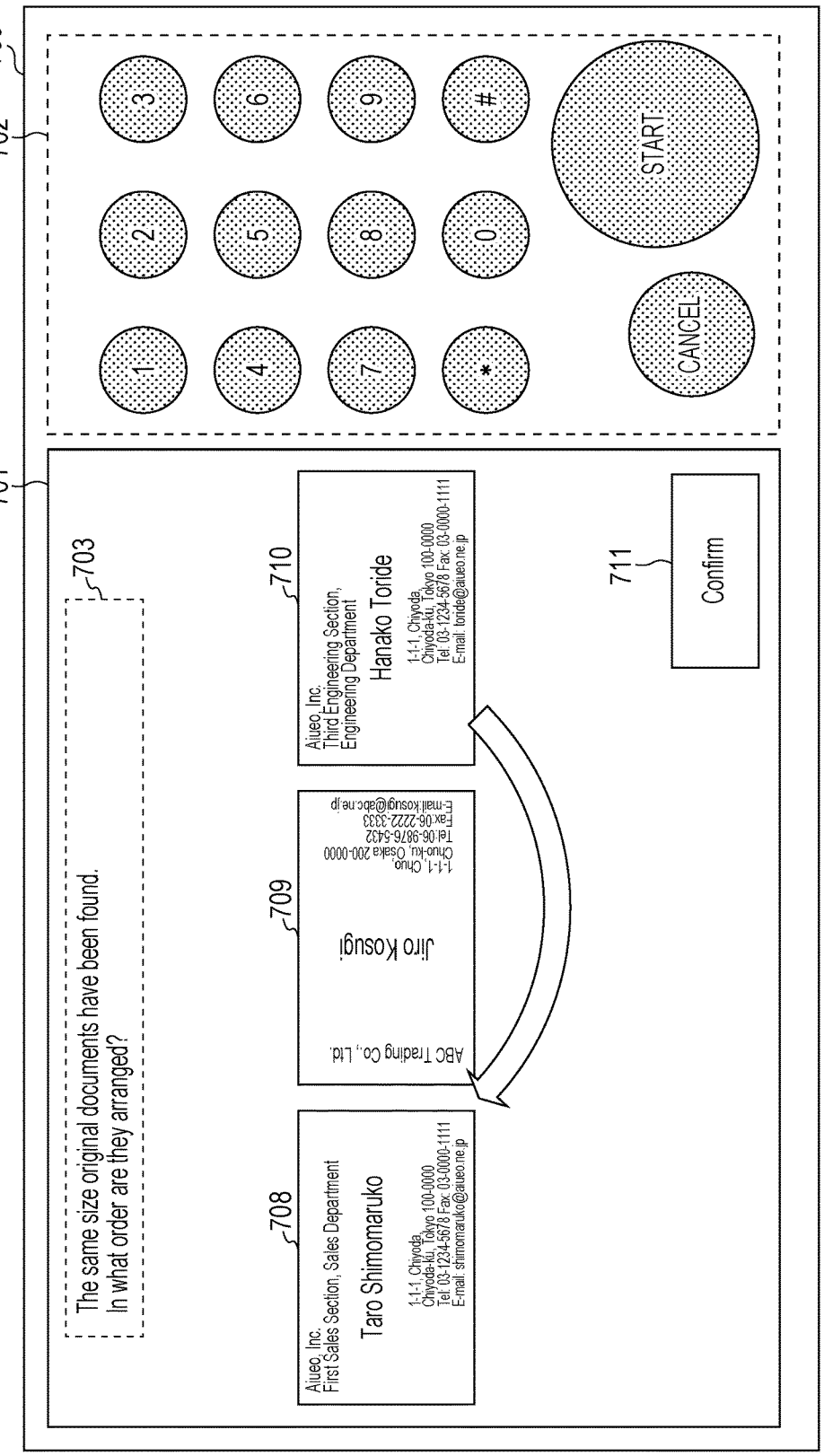

IMAGE PROCESSING APPARATUS, IMAGE PROCESSING SYSTEM, CONTROL METHOD FOR IMAGE PROCESSING APPARATUS, AND NON-TRANSITORY COMPUTER READABLE MEDIUM

BACKGROUND OF THE INVENTION

Field of the Invention

The present disclosure relates to one or more embodiments of an image processing apparatus capable of acquiring, by using an image scanning apparatus, such as a scanner, image data of multiple original documents arranged, and segmenting the image data into pieces of image data of the respective original documents, an image processing system, a control method for the image processing apparatus, and a non-transitory computer readable medium.

Description of the Related Art

In related art, there is processing in which multiple original documents, such as standard-size form documents, and non-standard-size receipts, business cards, or cards, are placed in a certain order on a scanning surface of an image scanning apparatus, such as a scanner, and scanned as one piece of image data, and a scanned image is segmented into images of the respective original documents. Such processing is referred to as multiple cropping processing.

Japanese Patent Laid-Open No. 2009-272678 discloses a technique in which a set of multiple original documents placed in a certain order on a scanning surface of an image scanning apparatus is scanned, a scanned image is segmented by multiple cropping processing, images into which the image has been segmented are assigned to pages, and one file of multiple pages is created.

Japanese Patent Laid-Open No. 2009-239594 discloses an edit method in which multiple original documents are automatically scanned by using an automatic document feeder (ADF), and scanned images are displayed by a personal computer (PC) application or the like to change a page order easily.

In the case where a set of multiple original document pages placed in a certain order on a platen glass is scanned and the multiple pages are converted into one file, the page order in which original documents are arranged in the one file has to be decided. The order at this time is uncertain, and an initial page order has to be decided immediately after segmentation.

On the other hand, also in the case where a process of changing a page order is performed by a file page editing function in a PC application, if an initial page order is not the order desired by a user, editing involves a lot of work.

Furthermore, although Japanese Patent Laid-Open No. 2009-239594 or the like discloses a technique to enable file page editing to be performed with increased ease, the file page editing has to be performed by using a device (for example, a PC application) different from a scanning apparatus, and work is cumbersome.

SUMMARY OF THE INVENTION

One or more features of the present disclosure have been accomplished in view of the above-described issues. In at least one embodiment of the present disclosure, a set of multiple original document pages placed in a certain order on a platen glass is scanned, and, if it is desired to convert the multiple pages into one file, an initial order is automatically presented, and then a user changes the order.

At least one embodiment of an image processing apparatus according to the present disclosure includes: a scanning unit configured to scan multiple original documents placed on a platen glass and generate image data; an acquisition unit configured to acquire pieces of image data of the respective original documents from the image data generated by the scanning unit; a decision unit configured to decide on a page order based on pieces of geometric information of the pieces of image data acquired by the acquisition unit; and a file creation unit configured to convert the pieces of image data of the respective original documents into one file in the page order decided by the decision unit and store the one file.

According to other aspects of the present disclosure, one or more additional image processing apparatuses, one or more image processing systems, one or more control methods and one or more storage mediums for use with same are discussed herein. Further features of the present disclosure will become apparent from the following description of exemplary embodiments with reference to the attached drawings.

BRIEF DESCRIPTION OF THE DRAWINGS

FIG. 4 illustrates an example of the placement of original documents when the original documents are scanned in at least one embodiment of the present disclosure.

FIGS. 8A and 8B each illustrate an example of a user interface (UI) display in at least one embodiment of the present disclosure.

FIG. 9 illustrates a file to be created finally in at least one embodiment of the present disclosure.

FIG. 13 illustrates an example of a UI display in the yet at least another embodiment of the present disclosure.

DESCRIPTION OF THE EMBODIMENTS

One or more embodiments of the present disclosure will be described in detail below with reference to the drawings.

Note that components described in the embodiments are merely examples, and the scope of the present disclosure is not limited to them.

First Embodiment

System Configuration

Figure 1:
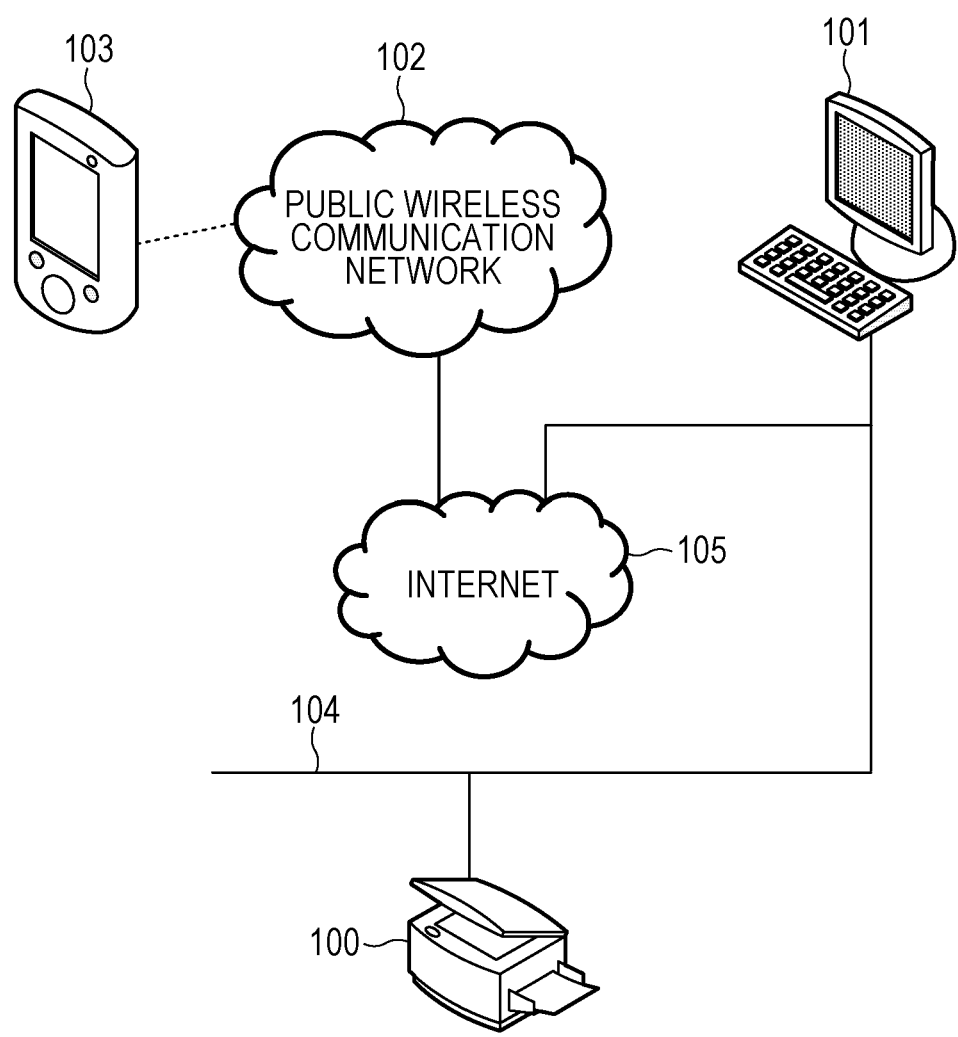
FIG. 1 illustrates an overall configuration of a system to which one or more embodiments of the present disclosure is applicable.

FIG. 1 illustrates an overall configuration of an image processing system to which at least this embodiment is applicable.

As illustrated in FIG. 1, terminals, such as an image processing apparatus 100 and a personal computer (PC) 101, are connected to a local area network (LAN) 104 composed of an Ethernet (registered trademark) network, a wireless LAN, and the like and connected to the Internet 105. A mobile terminal 103 is connected to the Internet 105 via a public wireless communication network 102 or the like. The image processing apparatus 100, the PC 101, and the mobile terminal 103 are connected to the Internet 105 via the LAN 104 or the public wireless communication network 102 so that they can communicate with one another. In the configuration, with respect to the PC 101 and the mobile terminal 103, only one of them may be provided. Alternatively, only the image processing apparatus 100 may be provided.

In at least one embodiment, the image processing apparatus 100 is a multifunction apparatus including an operation unit, a scanner unit, and a printer unit. In the system according to this embodiment, the image processing apparatus 100 is used as a scanning terminal for multiple standard-size original documents and non-standard-size original documents. The image processing apparatus 100 has the operation unit including a display unit, such as a user interface (UI), a touch panel, and hardware buttons. The image processing apparatus 100 displays an error notification, an instruction notification, and the like via the operation unit. The image processing apparatus 100 receives various setting operations via the operation unit.

The PC 101 displays an image acquired by the image processing apparatus 100. The PC 101 has a PC application or the like and stores a file acquired from the image processing apparatus 100. The PC 101 is further capable of communicating with external storage, such as the cloud or a server, and transmitting a stored file to the external storage. Although, in this embodiment, the PC 101 has functions capable of storing a file and transmitting it to the external storage, the image processing apparatus 100 can also have the same functions and thus can store a file and transmit it to the external storage by itself.

In at least one embodiment, the mobile terminal 103 is a smartphone or tablet including an operation unit, a wireless communication unit, and an application unit that runs a web browser. In the system according to this embodiment, like the PC 101, the mobile terminal 103 can be used as a display terminal, an operation terminal, and a file storage terminal. The PC 101 and the mobile terminal 103 overlap each other in their functions, such as a display function, an operation function, and a file storage function. Thus, although both of the PC 101 and the mobile terminal 103 can be used, only one of them may be used.

The above-described components are merely examples, and all the components do not have to be provided. In the image processing apparatus 100, for example, if a storage function of storing a file and a transmission function of performing transmission to the external storage can be executed in addition to a scan function of scanning an original document and a display and operation function, the image processing system can be implemented by only the image processing apparatus 100.

Hardware Configuration of Image Processing Apparatus 100

Figure 2:
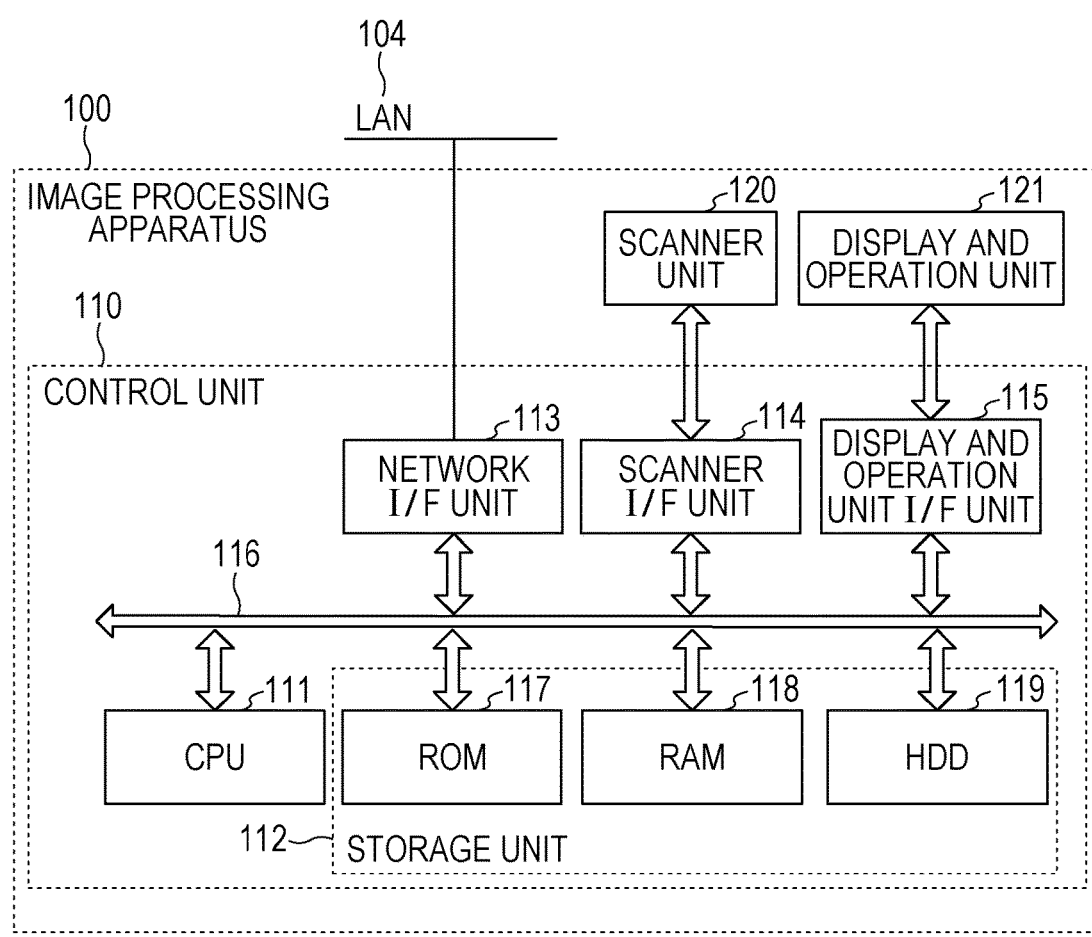
FIG. 2 illustrates an example of a hardware configuration of at least one embodiment of an image processing apparatus according to the present disclosure.

FIG. 2 is a block diagram illustrating a configuration of at least one embodiment of the image processing apparatus 100. A control unit 110, a central processing unit (CPU) 111, a storage unit 112, a network interface (I/F) unit 113, a scanner I/F unit 114, and a display and operation unit I/F unit 115 are connected to one another via a system bus 116 in such a manner as to be able to communicate with one another. The control unit 110 controls operation of the entire image processing apparatus 100.

The CPU 111 reads out at least one control program stored in the storage unit 112 and performs various control operations, such as scan control and transmission control.

The storage unit 112 stores and holds the at least one program, image data, setting data, processing result data, and the like. The storage unit 112 includes a read only memory (ROM) 117, which is a nonvolatile memory, a random access memory (RAM) 118, which is a volatile memory, a hard disk drive (HDD) 119, which is a large-capacity storage area, and the like.

The ROM 117 holds the control program and the like, and the CPU 111 performs control to read out the control program.

The RAM 118 is used as a temporary storage area, such as a main memory or work area for the CPU 111.

The network I/F unit 113 connects the control unit 110 (image processing apparatus 100) to the LAN 104. The network I/F unit 113 transmits image data to external devices (the PC 101 and the mobile terminal 103 in this embodiment) on the LAN 104 and receives various pieces of information from the external devices on the LAN 104.

The scanner I/F unit 114 connects the control unit 110 to a scanner unit 120. The scanner unit 120 scans an image on or of an original document to generate image data and inputs the image data to the control unit 110 via the scanner I/F unit 114.

The display and operation unit I/F unit 115 connects the control unit 110 to a display and operation unit 121. The display and operation unit 121 includes a liquid crystal display having a touch panel function, a keyboard, and the like.

Although the image processing apparatuses 100 may further include the printer unit and other units, these units are not used in at least this embodiment, and they are thus omitted.

As described above, the image processing apparatus 100 according to at least this embodiment can provide image processing functions by using the above-described hardware configuration.

Image Processing Functions

The configuration and processing flow of image processing functions according to at least this embodiment will be described below.

The processing flow is implemented by the CPU 111 executing a program according to at least one embodiment of the present disclosure.

Figure 3:
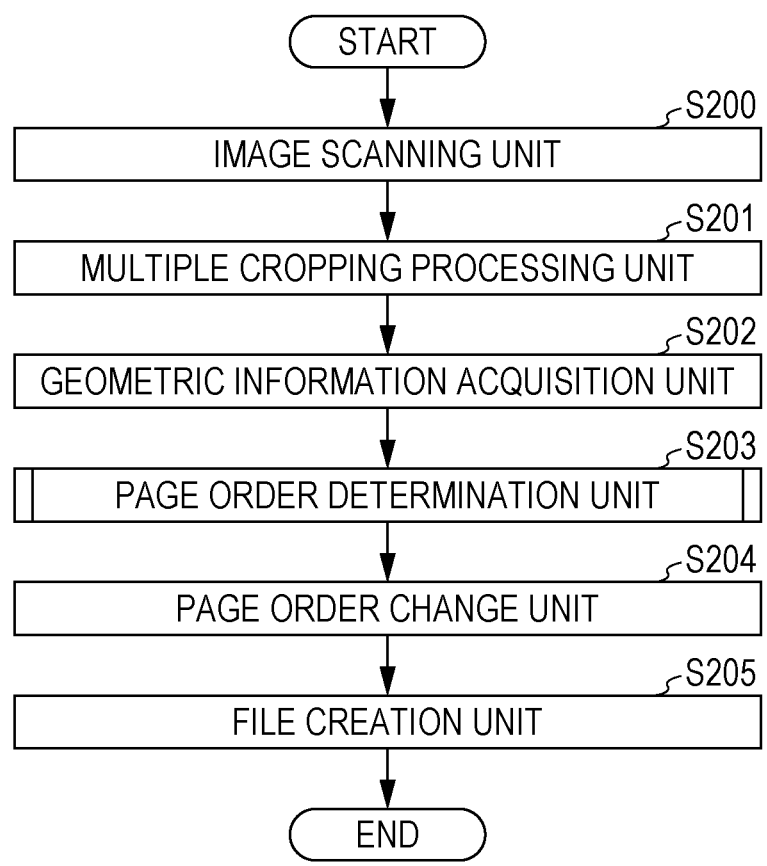
FIG. 3 is a flowchart of all image processing functions according to at least one embodiment of the present disclosure.

FIG. 3 illustrates an example of a configuration of image processing functions according to at least this embodiment. As illustrated in FIG. 3, examples of a processing function(s) according to at least this embodiment mostly include an image scanning unit S200, a multiple cropping processing unit S201, a geometric information acquisition unit S202, a page order determination unit S203, a page order change unit S204, and a file creation unit S205.

Image Scanning Unit S200

Figure 4:
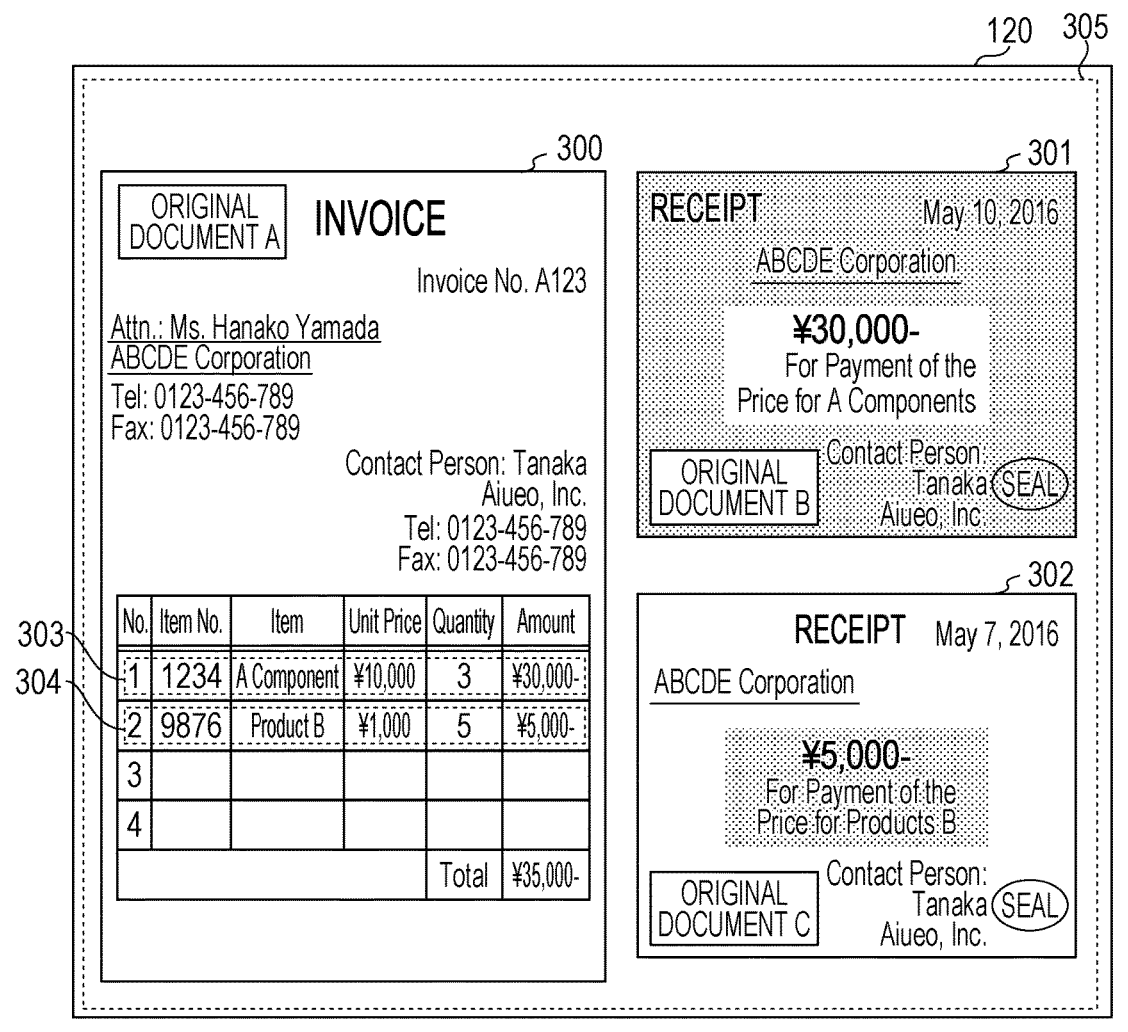

First, in the image scanning unit denoted by S200, multiple original documents are acquired from the scanner unit 120. Thus, the original documents placed on a scanning glass surface of the scanner unit 120 are scanned to generate data as a bitmap data image. The generated image is stored in the HDD 119 in the image processing apparatus 100. An example of the placement of original documents when scanning is performed in the image scanning unit S200 will be described with reference to FIG. 4. FIG. 4 illustrates an example of the placement of multiple original documents when the original documents are scanned by the scanner unit 120 according to at least this embodiment. On the scanning surface of the scanner unit 120 capable of scanning, as multiple original documents placed on a platen glass, a region 305 with dimensions of A3, for example, a user places original documents. As original documents to be placed, original documents, such as a standard-size original document A 300 (A4-size invoice, for example), and multiple non-standard-size original documents B 301 and C 302 (receipts, for example), are placed in a certain order on the scanning surface. With respect to three types of original documents in this example, the original document B 301 and the original document C 302 are documents proving detailed items 303 and 304 written in the original document A 300, respectively, and an example of a set of three original documents is given.

The function of the image scanning unit denoted by S200 has so far been described.

Multiple Cropping Processing Unit S201

In the multiple cropping processing unit denoted by S201, in at least one embodiment, the CPU 111 in the image processing apparatus 100 acquires the scanned image stored in the HDD 119 and segments the image into original document images of the respective original documents. Thus, the multiple original document images contained in the image scanned in S200 can be acquired. The image scanned in the image scanning unit S200 will be described with reference to FIG. 5. A reference numeral 403 in FIG. 5 denotes the acquired image, and the image with an origin point at its upper-left corner has dimensions of X pixels in width and Y pixels in height. From the acquired image, regions in which the respective original documents are placed are extracted, and images of the regions denoted by 400, 401, and 402 of the respective original documents (original documents A, B, and C) are thus acquired. In multiple cropping processing in which only original document portions are extracted from the multiple original document images contained in the image scanned in S200 by the CPU 111, image segmentation is performed by using a method of performing segmentation into rectangular regions on a basis of frame edges of the original documents. Multiple cropping processing can be implemented by a known segmentation technique. The original document images subjected to multiple cropping processing are stored in the HDD 119 in the image processing apparatus 100.

The function of the multiple cropping processing unit denoted by S201 has so far been described.

Geometric Information Acquisition Unit S202

Figure 5:
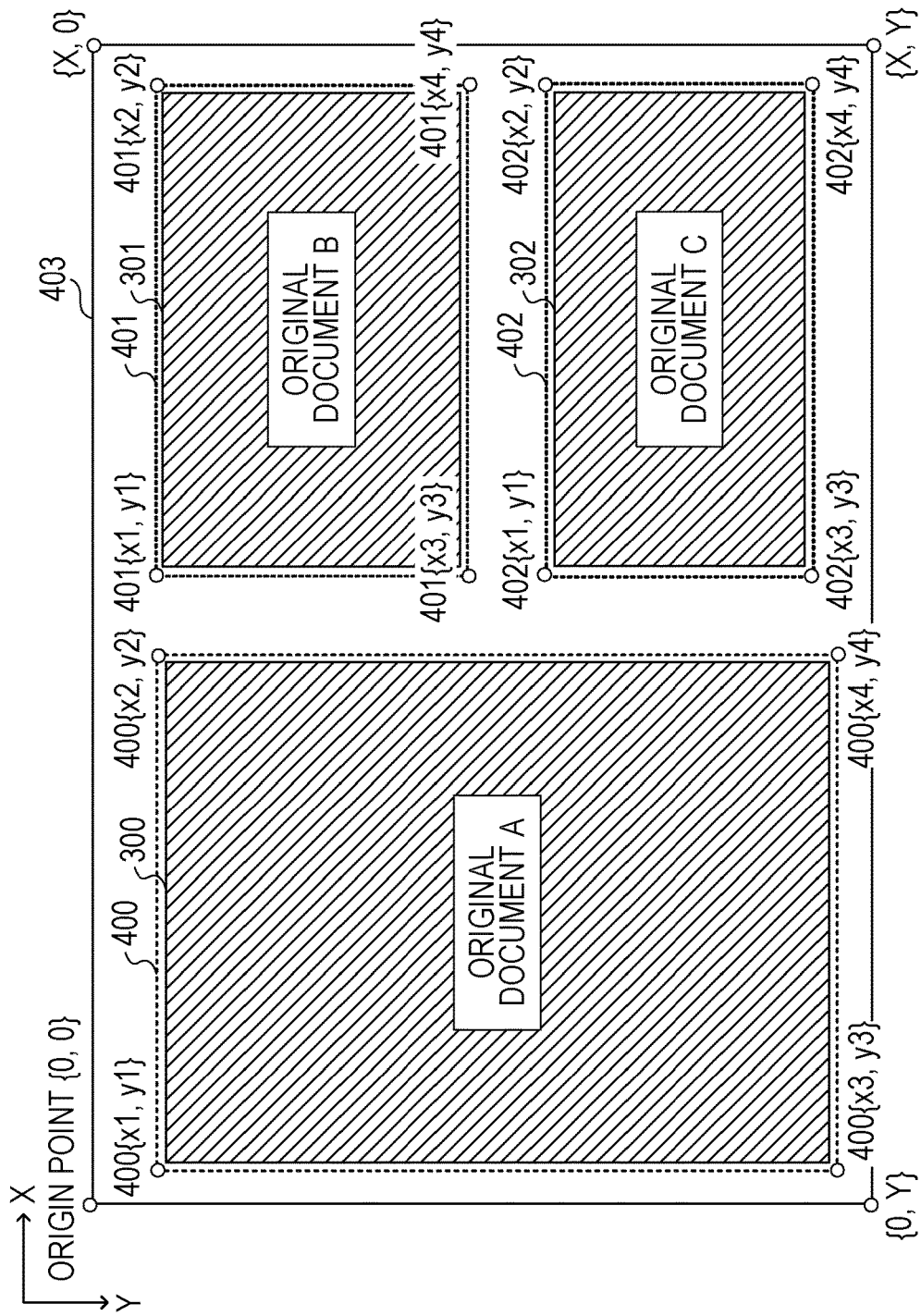
FIG. 5 illustrates segmentation into original document images and acquisition of coordinate values in one or more embodiments of the present disclosure.

In the geometric information acquisition unit denoted by S202, in at least one embodiment, the CPU 111 acquires an image area of each original document image obtained by segmentation in S201 and position coordinates at which each image on the scanned image is located. The process performed in S202 can be performed simultaneously with multiple cropping processing performed in S201. As illustrated in FIG. 5, an image is segmented into original document images, and coordinate values of four vertices of each original document image are acquired. In this embodiment, in the case of 400 (original document A), the CPU 111 acquires coordinate values of 400{x1, y1}, 400{x2, y2}, 400{x3, y3}, and 400{x4, y4} that are four vertices of 400. The CPU 111 acquires four vertices of each of all the obtained original document images (400{xi, yi} to 402{xi, yi}: (i=1 to 4)). Subsequently, the CPU 111 calculates image dimensions of width and height from the acquired coordinate values of the four vertices. In the case of 400 (original document A), the CPU 111 acquires 400{x1, y1}, 400{x2, y2}, 400{x3, y3}, and 400{x4, y4} that are four vertices of 400. Then, the CPU 111 calculates a width (a distance from 400{x1, y1} to 400{x2, y2}) and a height (a distance from 400{x1, y1} to 400{x3, y3}).

With respect to a calculation method, if a placed original document has been placed in parallel with a main scanning direction of a scanner, calculations can be performed by the following expressions.

width $W=x2-x1$ height $H=y3-y1$

If a placed original document has not been placed in parallel with the main scanning direction of the scanner, calculations can be performed by the following expressions.

width $W=\sqrt{(x2-x1)^2+(y2-y1)^2}$ height $H=\sqrt{(x3-x1)^2+(y3-y1)^2}$

In the above-described calculation method of calculating the width and height of an original document, the width and the height of the original document are respectively calculated from the length of its upper side and the length of its left side. Alternatively, when coordinate values of 400{x4, y4} are used, for example, a method may be employed in which the average of the lengths of upper and lower sides of the original document, or either the length of the upper side or the length of the lower side, whichever is greater, is used as its width. Similarly, a method may be employed in which the average of the lengths of left and right sides of the original document, or either the length of the left side or the length of the right side, whichever is greater, is used as its height.

If an original document has been placed in parallel with the main scanning direction of the scanner, specifically, the following expressions are used.

width $W$=either $x2-x1$ or $x4-x3$, whichever is greater, or the average of $x2-x1$ and $x4-x3$ height $H$=either $y3-y1$ or $y4-y2$, whichever is greater, or the average of $y3-y1$ and $y4-y2$ Additionally, on the basis of the calculated width and height, an image area is calculated. With respect to a calculation method, an image area can be calculated by multiplying the width by the height. The method may be any method in which the area of the region surrounded by the four vertices of 400 is calculated, and this embodiment does not limit the method to a particular method. Numerical data, such as coordinate values, widths, heights, and areas that have been acquired and/or calculated by the geometric information acquisition unit in S202, is stored in the HDD 119 in the image processing apparatus 100 together with the original document images in such a manner as to be associated with the images. A storage location for numerical data may be the storage unit 112, such as the ROM 117 or the RAM 118.

The function of the geometric information acquisition unit denoted by S202 has so far been described.

Page Order Determination Unit S203

In the page order determination unit denoted by S203, in at least one embodiment, the CPU 111 determines a page order for storing the original document images on the basis of the image areas and the position coordinates at which the images on the scanned image are located that are stored in the storage unit 112. As a method implemented in the page order determination unit S203, a plurality of methods can be provided. In this embodiment, the following two methods will be described below.

Figure 6:
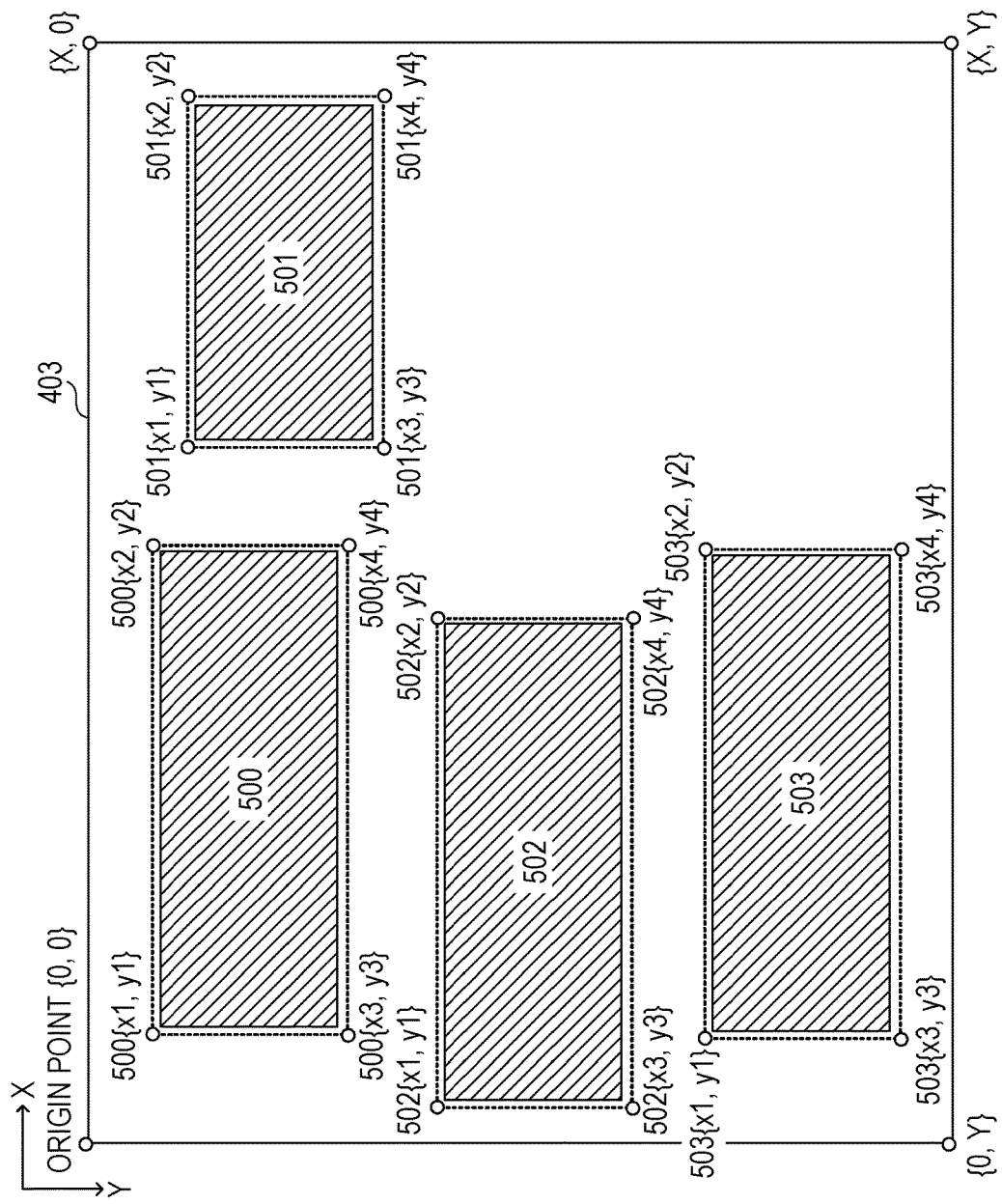
FIG. 6 illustrates segmentation into original document images and acquisition of coordinate values in one or more embodiments of the present disclosure.
Figure 7:
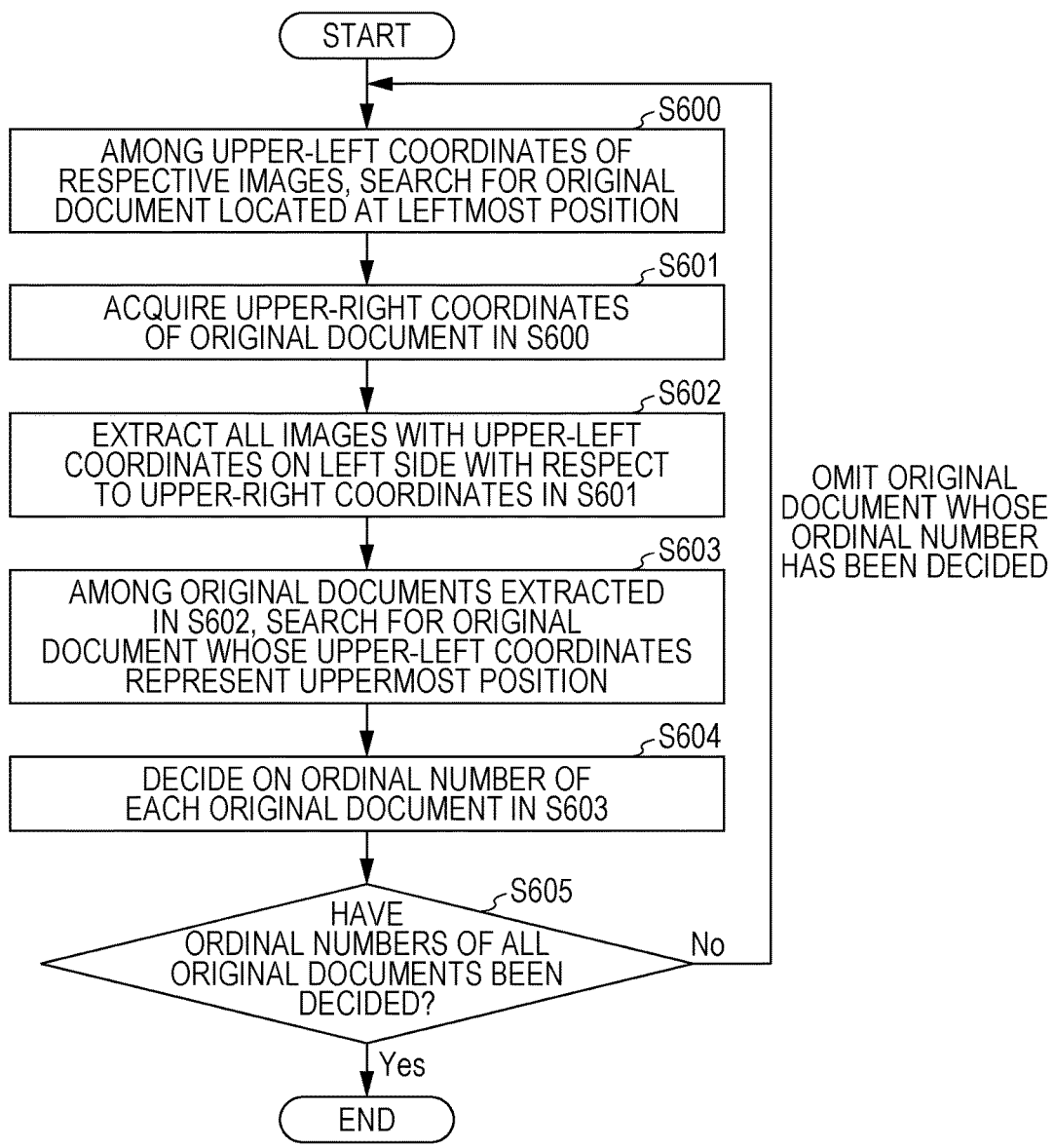
FIG. 7 is a flowchart for deciding on a page order in at least one embodiment of the present disclosure.

(1) a method using position coordinates at which each image on the scanned image is located (2) a method using the image area of each original document image obtained by segmentation (1) Method using Position Coordinates at which Each Image on Scanned Image is Located First, in one or more embodiments, a method using position coordinates at which each image on the scanned image is located will be described. Among four vertex coordinates of each original document acquired in the geometric information acquisition unit S202, upper-left coordinates and upper-right coordinates of the original document are used. This embodiment will be described with reference to FIG. 6. In FIG. 6, four original documents 500 to 503 are placed on the scanning surface, and their coordinate values of 500{xi, yi} to 503{xi, yi}: (i=1 to 4) have been acquired. FIG. 7 illustrates a flow of page order determination processing using position coordinates at which each image on the scanned image is located.

In S600, among upper-left coordinates (500{x1, y1} to 503{x1, y1}) of the respective images, the CPU 111 searches for an original document located at a leftmost position (an X-coordinate value is small). In the case of FIG. 6, among the original documents 500 to 503, the original document 502 is selected because x1 of 502{x1, y1} is the smallest value.

In S601, the CPU 111 acquires upper-right coordinates of the original document (original document 502) in S600. In the case of FIG. 6, the upper-right coordinates are 502{x2, y2}.

In S602, the CPU 111 searches for all images with upper-left coordinates on the left side (on which an X-coordinate value is small) with respect to the upper-right coordinates in S601. In the case of FIG. 6, when images with the upper-left coordinates (500{x1, y1}, 502{x1, y1}, and 503{x1, y1}) smaller than 502{x2, y2} in X-coordinate value are searched for, the original documents 500, 502, and 503 are extracted.

In S603, among the original documents in S602, the CPU 111 searches for an original document whose upper-left coordinates represent an uppermost position. In the case of FIG. 6, among the upper-left coordinates (500{x1, y1}, 502{x1, y1}, and 503{x1, y1}) of the original documents 500, 502, and 503, when an original document located at an uppermost position (a Y-coordinate value is small) is selected, the original document 500 is selected.

In S604, the CPU 111 decides on the ordinal number of the original document selected in S603. In the case of FIG. 6, the original document 500 is the first.

In S605, the CPU 111 determines whether the ordinal numbers of the original documents of all the images have been decided. If the ordinal numbers of all the original documents have been decided, the processing ends. If there is an original document whose ordinal number has not been decided, the original document whose ordinal number has been decided in S604 is omitted, and the CPU 111 performs the processes of S600 to S604.

When the CPU 111 performs the processes of S600 to S605, the ordinal numbers of original documents can be decided from the uppermost original document placed on the left portion. In the case of FIG. 6, the ordinal numbers of original documents are decided in the order of 500, 502, 503, and 501. In the case of FIG. 5, the ordinal numbers of original documents are decided in the order of the original documents A, B, and C.

In this embodiment, although, when the ordinal numbers of original documents are decided, preference is given to original documents placed on the left side, preference can be given to original documents placed on the right side. In this case, the ordinal numbers of the original documents are decided in the order of 501, 500, 502, and 503.

(2) Method using Image Area of Each Original Document Image obtained by Segmentation Next, at least one embodiment of a method will be described in which the order is decided by using the image area of each original document image obtained by segmentation. A value of the area of each original document acquired in the geometric information acquisition unit S202 is used. In S203, the image areas of the respective original documents are sorted and arranged in descending order. In the case of FIG. 5, the following relationship is obtained:

area of original document $A$>area of original document $B$>area of original document $C$.

Thus, the order is the original document A, the original document B, and the original document C. Furthermore, when the areas of the respective original documents are compared with one another, if original documents with the same area are found, their original documents are displayed on the display and operation unit 121, thereby enabling the user to select the order of the original documents with the same area.

In at least this embodiment, there have been described two examples: the method using position coordinates at which each image on the scanned image is located and the method using the image area of each original document image obtained by segmentation. However, this embodiment is not limited to these, and any method may be employed in which the order is decided by using geometric information, such as coordinate information, area information, the width and height of each original document image, and the ratio between width and height.

The function of the page order determination unit denoted by S203 has so far been described.

Page Order Change Unit S204

The page order change unit denoted by S204 displays, in at least one embodiment, on the display and operation unit 121, thumbnail images of the original documents arranged in the order automatically decided by the CPU 111 in S203, and provides a UI display for prompting the user to check the order and change the order.

A reference numeral 700 in FIGS. 8A and 8B represents the display and operation unit 121. On 700, a UI screen (including display and operation functions) denoted by 701 and hardware buttons denoted by 702 are provided. The CPU 111 provides a notification that prompts the user to check and modify the order on 701. In this embodiment, a message that prompts the user to check and change a page order is displayed in a message display region 703. Thumbnail images (704 to 706) of the original document images are arranged and displayed in the order decided in S203.

The user checks the order in which pages displayed in FIG. 8A are arranged. If the user accepts the order, the user directly presses a store button 707 to perform storage. If the user wants to change the order, the user performs a change operation on the screen of the display and operation unit 121. For example, if the user wants to insert the page of the thumbnail image 706 between the pages of the thumbnail images 704 and 705, the user touches the display and operation unit 121 on which the thumbnail image 706 is displayed and performs a drag-and-drop operation. Thus, the thumbnail image 706 is moved to a position between the thumbnail images 704 and 705, and the order can be changed easily. When the order is changed, the order of the thumbnail images 705 and 706 displayed is changed as illustrated in FIG. 8B, and the order is determined. After the page order is changed, the user finally checks the order and presses the store button 707 to perform storage.

The method described in this embodiment in which a page order is checked and changed is an example. There are various methods that may be used, such as a method in which thumbnail images are sequentially touched and selected beginning at page 1, and a method in which page numbers are input by using hardware keys, and thus this embodiment is not limited to the above-described method.

The function of the page order change unit denoted by S204 has so far been described.

File Creation Unit S205

In the file creation unit denoted by S205, in at least one embodiment, the CPU 111 in the image processing apparatus 100 creates a file of multiple pages on a basis of the images stored in the storage unit 112 and the order finally decided in S204. As a format in which multiple images can be stored separately for each page and converted into one file, there is portable document format (PDF). Furthermore, there are XML paper specification (XPS), multi-page tagged image file format (TIFF), and the like. When a file is created in any of these formats, the control unit 110 arranges pages of the original document images obtained by segmentation in multiple cropping in the order finally decided in S204 and stores them in one file.

Figure 9:
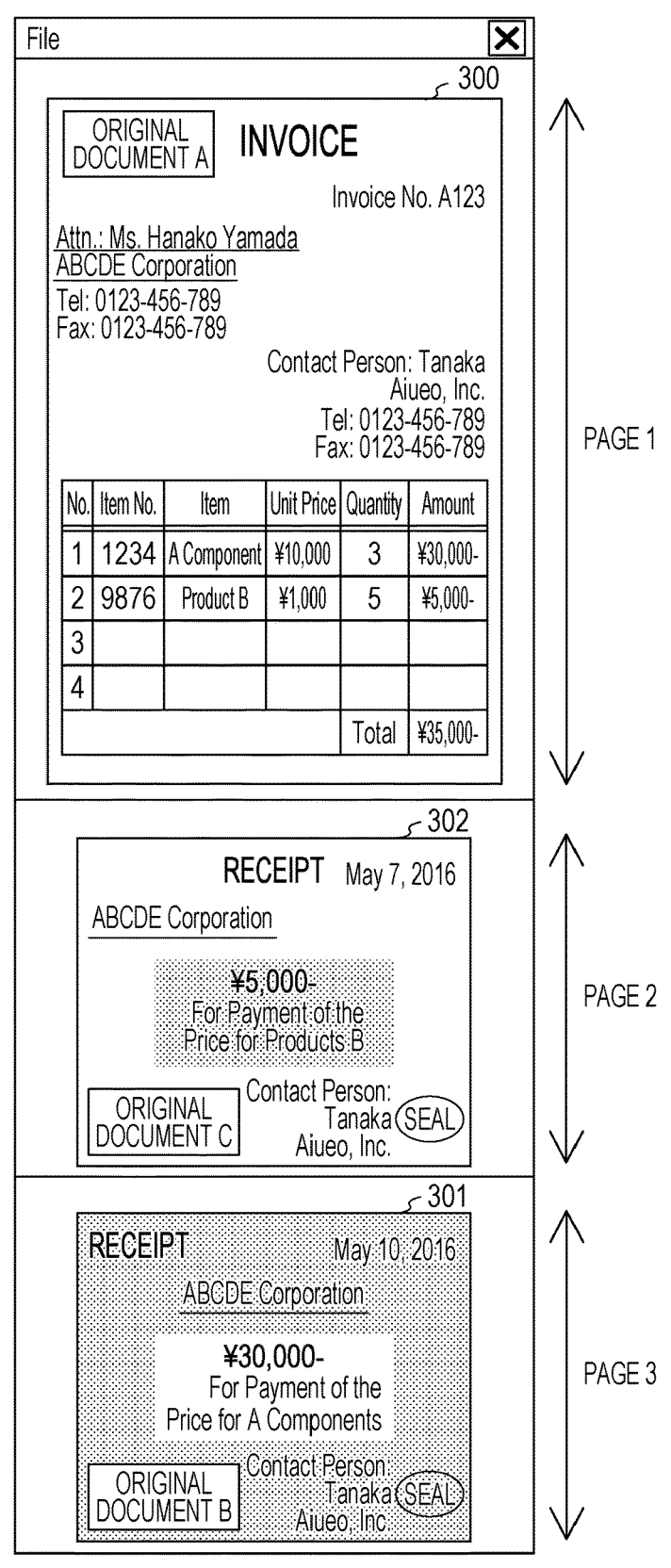

FIG. 9 illustrates how a file to be created looks. The CPU 111 uses the original document A 300, the original document B 301, and the original document C 302 that are original document images obtained by segmentation in the multiple cropping processing unit denoted by S201, and the page order checked and changed in S204, and creates a file in the order illustrated in FIG. 9. Here, the changed page order is the original document A 300 on page 1, the original document C 302 on page 2, and the original document B 301 on page 3. In the file to be created, pages are delimited for each original document and stored in the order of the original document A 300 on page 1, the original document C 302 on page 2, and the original document B 301 on page 3.

The function of the file creation unit denoted by S205 has so far been described.

The file created in S205 may be stored in the HDD 119 in the image processing apparatus 100. Or alternatively, file data may be transmitted to the PC 101 or the mobile terminal 103 and stored in the PC 101 or the mobile terminal 103, respectively.

In the first embodiment, as described above, a set of multiple original document pages placed in a certain order on the platen glass is scanned, and, if it is desired to convert the multiple pages into one file, an initial order can be decided automatically. Furthermore, the initial order is presented, thereby enabling a user-side override of the page order to be performed easily and enabling a reduction in the user's workload.

Second Embodiment

As described in the first embodiment, a set of multiple original document pages placed in a certain order on the platen glass is scanned, and, if the multiple pages are converted into one file, an initial order is automatically decided by using geometric information, such as position coordinates or image areas of respective images.

Figure 11:
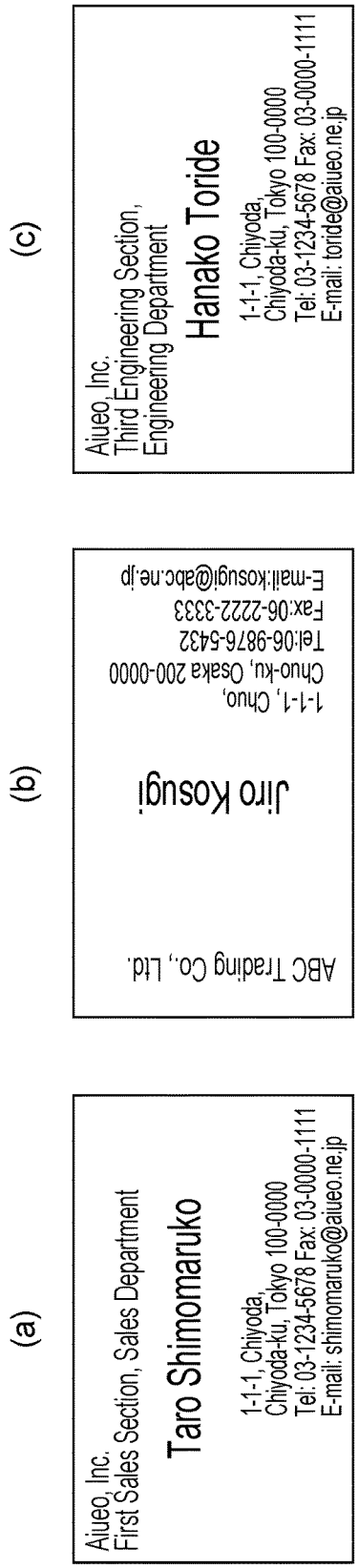
FIG. 11 illustrates samples of original documents in the at least another embodiment of the present disclosure.

Incidentally, in the case of images of business cards like samples illustrated in FIG. 11, reference symbols (a), (b), and (c) denote images obtained by segmentation in multiple cropping processing and having almost the same area. The Reference symbols (a) and (c) also denote original documents that are business cards of the same company and are similar to each other in layout. On the other hand, the reference symbol (b) denotes an original document that is different from (a) and (c) in company name and is also not similar to them in layout. When the order of the original documents is decided by using only geometric information, there is a possibility that the same type of original documents that it is desired to essentially bring together are not arranged together in the page order. There is a demand that the user wants to simply and easily bring together the same type of original documents in a page order and convert them into a file.

Thus, in at least the second embodiment to be described, the degree of image similarity between images obtained by segmentation in execution of multiple cropping processing is obtained, and the order of images can be obtained automatically so that the same type of images are arranged side by side. The second embodiment will be described below with reference to FIG. 10.

Figure 10:
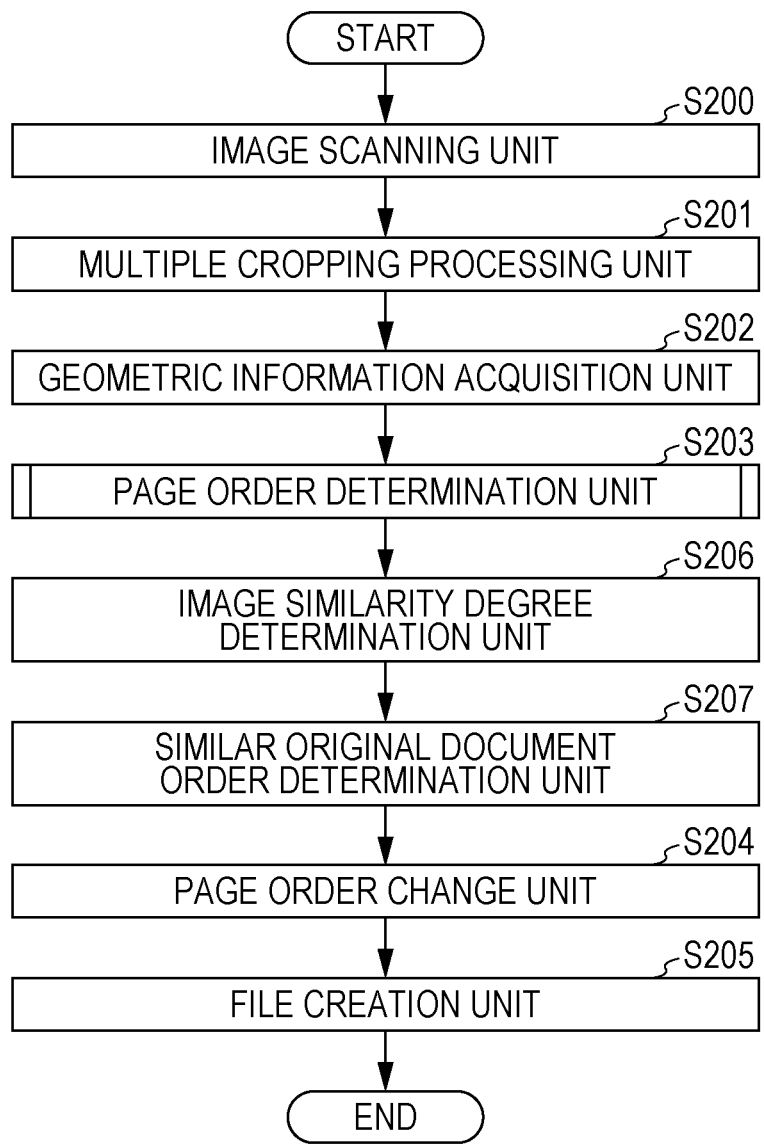
FIG. 10 is a flowchart of all image processing functions according to at least another embodiment of the present disclosure.

In FIG. 10, there are provided an image similarity degree determination unit S206 and a similar original document order determination unit S207 in addition to the configuration of FIG. 3.

Image Similarity Degree Determination Unit S206

In the image similarity degree determination unit denoted by S206, in at least one embodiment, the CPU 111 in the image processing apparatus 100 determines a degree of image similarity between original documents having almost the same image area in the geometric information acquisition unit denoted by S202. In sample examples of FIG. 11, the degree of similarity between (a) and (b), the degree of similarity between (b) and (c), and the degree of similarity between (a) and (c) are determined. As a result, the degree of similarity between (a) and (c) is high, and the degree of similarity between (a) and (b) and the degree of similarity between (b) and (c) are low. These results are output.

Similarity Determination Method

There are some methods for determining whether image similarity is high. As examples, four methods will be described here. A determination method may be a known technique, and any method may be employed in which the similarity between images can be determined.

(1) Difference Image

As a first method of at least one embodiment, there is a method in which phase matching is performed by pattern matching of images, a difference between the images is obtained, and a determination is made, from a mean square error or a signal to noise (SN) ratio, whether similarity is high. For example, matching of two images is performed, the phases of the images are matched on the basis of a position at which a correlation coefficient is high, and the positions of objects drawn on the images are matched. After the phases of the images coincide with each other, a subtraction or the like is performed on a pixel array for each pixel, and an image difference is calculated. From a difference image based on the image difference, a mean square error or an SN ratio is calculated, and it is determined, on a basis of whether the mean square error or the SN ratio is higher than a certain threshold, whether similarity is high.

(2) Difference between Histograms

As a second method in at least one embodiment, there is a method in which histograms of two images are acquired, a difference between the histograms is obtained, and a determination is made whether similarity is high. Histograms of signal values of two original document images are acquired. In acquisition of a histogram, in the case of a red-green-blue (RGB) image, a histogram of three channels, or a histogram of one channel obtained by combining RGB signals may be acquired. A difference between two acquired histograms is calculated, and it is determined, on a basis of whether a cumulative value of differences is higher than a certain threshold, whether similarity is high.

(3) Mean Pixel Value

As a third method in at least one embodiment, there is a method in which a determination is made whether a difference between mean pixel values is within a range of a certain value. Mean pixel values of respective images are calculated, and it is determined, on a basis of whether a difference between the mean pixel values is within the range of the certain value, whether similarity is high.

(4) aHash Method

As a fourth method in at least one embodiment, an average hash (aHash) method is used. A mean value of brightness values is obtained for each of two images. If a brightness value is larger than the mean value, a value is calculated as 1, and, if a brightness value is not larger than the mean value, a value is calculated as 0. The two images are compared on a basis of whether a value of 0 or 1 calculated for each pixel of one image is equal to a value calculated for the corresponding pixel of the other image.

By using such methods, the similarity between original documents is determined in the image similarity degree determination unit S206.

The function of the image similarity degree determination unit denoted by S206 has so far been described.

Similar Original Document Order Determination Unit S207

In the similar original document order determination unit denoted by S207, in at least one embodiment, the CPU 111 in the image processing apparatus 100 changes the order on the basis of the degree of image similarity determined in the image similarity degree determination unit denoted by S206 so that images exhibiting a high degree of similarity are on pages close to each other. In the sample examples of FIG. 11, the degree of similarity between (a) and (b), the degree of similarity between (b) and (c), and the degree of similarity between (a) and (c) are determined. As a result, the degree of similarity between (a) and (c) is high, and the degree of similarity between (a) and (b) and the degree of similarity between (b) and (c) are low. These results are output. In this case, to obtain the order in which (a) and (c) are arranged side by side, the order of (a), (b), and (c) is changed to the order of (a), (c), and (B), for example. Thus, when the order is changed in accordance with the degree of similarity between original documents, the same type of original documents can be arranged together.

The function of the similar original document order determination unit denoted by S207 has so far been described.

In the second embodiment described above, the degree of similarity between original documents is determined, and the order can be decided automatically so that the same type of original documents are arranged side by side.

Third Embodiment

As described in the first embodiment and the second embodiment, an initial order is decided entirely automatically. However, for example, if there are multiple original document images that are similar in area, an appropriate initial order is not able to be decided even in the configurations according to the first and second embodiments in some cases. In the third embodiment to be described, the user can partially make a decision when an initial order is decided.

Figure 12:
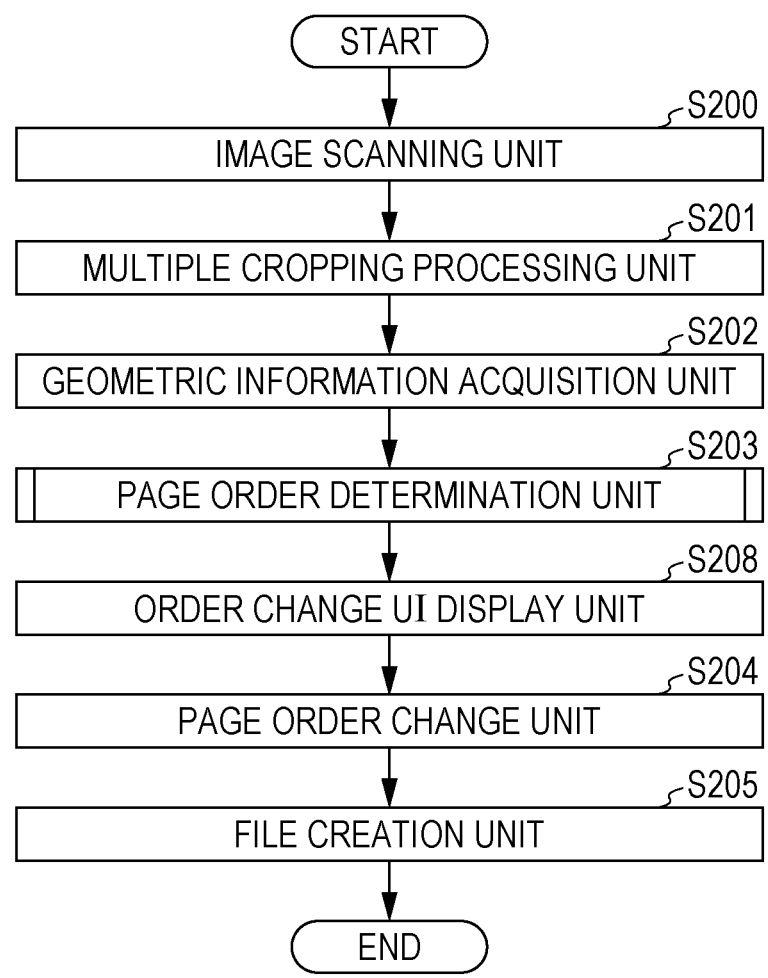
FIG. 12 is a flowchart of all image processing functions according to yet at least another embodiment of the present disclosure.

FIG. 12 illustrates a processing flow in the third embodiment. In FIG. 12, there is provided an order change UI display unit S208 in addition to the configuration of FIG. 3.

Order Change UI Display Unit S208

In the order change UI display unit denoted by S208, in at least one embodiment, the CPU 111 in the image processing apparatus 100 provides an order change UI display. This order change UI display may be displayed at all times. Or alternatively, the CPU 111 in the image processing apparatus 100 determines whether to provide an order change UI display, and, if the CPU 111 determines to provide the order change UI display, the CPU 111 may provide the order change UI display on the display and operation unit 121 in the image processing apparatus 100. For example, by using only geometric information acquired in the geometric information acquisition unit S202, a page order is not able to be estimated in the page order determination unit S203 in some cases.

Specifically, when the order of original document images is decided in descending order in accordance with their areas, there are multiple images with the same area (or similar areas) in some cases. In the case where it is determined that the order of original documents is not able to be decided by using only geometric information as described above, an order change UI display is provided on the display and operation unit 121. FIG. 13 illustrates an order change UI display displayed on the display and operation unit 121.

FIG. 13 illustrates the display and operation unit 121 as in FIGS. 8A and 8B. In this embodiment, as a content displayed on the UI screen denoted by 701, a message asking about a page order is displayed in the message display region 703. Reference numerals 708 to 710 denote thumbnail images of original document images whose ordinal numbers are not able to be decided in S203 and that need instructions, and the thumbnail images are arranged and displayed. In accordance with this UI, the user operates the display and operation unit 121 and decides on the order. The order is changed to a specified order by dragging and dropping an original document image, for example.

Alternatively, the order may be changed to the order in which the thumbnail images displayed on the display and operation unit 121 are touched. Among the thumbnail images displayed on the display and operation unit 121, an image that has been first touched appears on page 1. When a thumbnail image is touched, an ordinal number is displayed in the thumbnail image, thereby enabling the user to know the ordinal number. The same goes for page 2 and subsequent pages. For all images obtained by segmentation, their thumbnail images displayed on the display and operation unit 121 are touched, and their respective ordinal numbers are similarly displayed.

Although the description has been provided here in which, for all images obtained by segmentation in multiple cropping processing, respective instructions about the order are provided, images for up to a certain page can be specified. For example, among five images obtained by segmentation in multiple cropping processing, the user provides instructions to cause two images obtained by segmentation to appear on page 1 and page 2. Then, with respect to the remaining three images, if no instructions are provided, the page order, such as the order in which the three images are displayed, can be decided without user's instructions. After the user decides on a partial order, confirmation denoted by 711 is performed, and the order decision is completed.

In this embodiment, the example has been given in which an initial order is not able to be decided automatically. Furthermore, when multiple cropping processing is performed and an initial order for conversion into a file is decided, an image for only a page 1 can be specified, or images for a range up to a specified page can be specified.

The function of the order change UI display unit denoted by S208 has so far been described.

In the third embodiment described above, the user can partially make a specification when an initial order is automatically decided.

In one or more embodiments of the present disclosure, the above-described functions can be implemented not only by the image processing apparatus 100 but also by the entire system. The image processing apparatus 100 performs image scanning, and the PC 101 or the like may receive image data from the image processing apparatus 100 to perform image processing.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2016-207431 filed Oct. 24, 2016, which is hereby incorporated by reference herein in its entirety.

What is claimed is:

1. An image processing apparatus comprising:
a scanner that scans multiple original documents placed on a platen glass of the scanner to generate a scanned image;
a memory that stores instructions; and
at least one processor that executes the stored instructions to perform:
acquiring document images corresponding to the respective original documents by performing a multiple cropping process for the scanned image;
deciding a page order of the acquired document images based on area sizes of the acquired document images and position coordinates at which the acquired document images are located on the scanned image; and
arranging the document images of the respective original documents in the decided page order to create one file including the document images arranged in the decided page order.

2. The image processing apparatus according to claim 1, wherein the at least one processor executes the stored instructions to further perform displaying a user interface (UI) that presents the decided page order to a user and through which an instruction about changing the page order is provided.

3. The image processing apparatus according to claim 1, wherein the at least one processor executes the stored instructions to further perform determining a degree of similarity between the acquired document images, and wherein the page order of the acquired document images is decided based on the area sizes of the acquired document images, the position coordinates at which the acquired document images are located on the scanned image and the determined degree of similarity.

4. An image processing system comprising:
an image scanning apparatus; and
an image processing apparatus,
wherein the image scanning apparatus performs:
scanning multiple original documents placed on a platen glass of a scanner to generate a scanned image, and
transmitting the scanned image to the image processing apparatus via a network, and
wherein the image processing apparatus includes:
a memory that stores instructions; and
at least one processor that executes the stored instructions to perform:
acquiring document images corresponding to the respective original documents by performing a multiple cropping process for the scanned image;
deciding a page order of the acquired document images based on area sizes of the acquired document images and position coordinates at which the acquired document images are located on the scanned image; and
arranging the document images of the respective original documents in the decided page order to create one file including the document images arranged in the decided page order.

5. A control method for an image processing apparatus, the control method comprising:
- scanning multiple original documents placed on a platen glass of a scanner to generate a scanned image;
- acquiring document images corresponding to the respective original documents by performing a multiple cropping process for the scanned image;
- deciding on a page order of the acquired document images based on area sizes of the acquired document images and position coordinates at which the acquired document images are located on the scanned image; and
- arranging the document images of the respective original documents in the decided page order to create one file including the document images arranged in the decided page order.

6. A non-transitory computer readable medium in which at least one program is stored for causing a computer to execute a control method for an image processing apparatus, the control method comprising:
- scanning multiple original documents placed on a platen glass of a scanner to generate a scanned image;
- acquiring document images corresponding to the respective original documents by performing a multiple cropping process for the scanned image;
- deciding a page order of the acquired document images based on area sizes of the acquired document images and position coordinates at which the acquired document images are located on the scanned image; and
- arranging the document images of the respective original documents in the decided page order to create one file including the document images arranged in the decided page order.

* * * * *